UNITED STATES PATENT OFFICE 1,983,274

ORE LEACHING

Theodore Earle, Denver, Colo.

No Drawing. Application April 2, 1931,
Serial No. 527,355

1 Claim. (Cl. 75—18)

My invention relates to a process for the recovery of the valuable constitutents from sand, ore, earth or other material or combinations of materials having one or more valuable constituents or fractional content.

Many deposits found in nature contain constitutents or contents of such high value that even one ounce thereof per ton of the deposit would be very highly profitable if a cheap method of recovery of the valuable matter could be employed.

In such a deposit the problem is not so much to obtain a chemical reagent of great strength, since that means high costs, as it is to obtain a chemical reagent which can be used dilute and at low cost and which will still be able to reach and dissolve substantially all of the comparatively small percentage of valuable material or binder of valuable material in the entire mass treated.

The object of my invention, therefore, is to provide a process in which only a small amount of chemical reagent need be used, and to spread this chemical reagent evenly throughout the material to be treated, and then recover the dissolved and freed valuable material.

My process broadly comprises adding a relatively small amount of a dilute chemical reagent to the material to be treated, concentrating the chemical reagent by heating the material and thereby driving off the desired amount of water or other diluent from the material and from the chemical reagent, washing the material to put into a dilute solution the matter that has been dissolved by the chemical reagent, and recovering the dissolved and freed valuable matter from the solution, by precipitation or by any other well known recovery methods.

In detail, my process to suit particular conditions and materials may include heating the material, after the evaporation of much or all of the water or other diluent from both the material and the chemical reagent, to a temperature above that of boiling water, to still further add to the power of the chemical reagent; in fact in most cases by the use of this detail, my process will dissolve a greater percentage of the desired constituent, in a shorter time, and at lower cost. In any case the chemical reagent used, and its strength, the degree of evaporation of the diluent and the temperature used and all other steps in the process will be selected to best suit all conditions and requirements then being dealt with.

What occurs in my process is substantially as follows:

The dilute chemical reagent is employed because it is cheap and may therefore be used in sufficient quantity to thoroughly wet each particle of the material being treated, any excess being drained or otherwise removed so that a minimum amount of evaporation of the diluent will have to take place.

As the heat evaporates the contained water or other diluent, the chemical reagent around each particle becomes more and more concentrated.

At the same time, the boiling point of the chemical reagent generally becomes higher as it becomes more concentrated, till it may perhaps even reach 100 degrees or more above the boiling point of water.

The film of concentrated chemical reagent about each particle, it is true, is very thin, but as noted in the instance given above, the small particles of say an ounce of valuable material distributed throughout a ton of matter are generally minute and a great amount of concentrated chemical reagent is not required for each particle, or at any one spot in the mass.

In all cases the activity of the chemical reagent increases greatly as heat is added and as the water or other diluent evaporates.

And where the material, after the evaporation of some or all of the water or other diluent is heated to a temperature above that of boiling water, the activity of the chemical reagent, in most cases, seems to be many times increased, this increase apparently depending upon not only the chemical reagent itself, but also upon the kind and condition of the material to be dissolved, the temperature to which the material and the chemical reagent are raised and whether a reducing or oxidizing atmosphere is used in the heat treatment.

For instance, in one case, a cold chemical reagent was added to a process having a recovery of the desired valuable constituents of about 54%, without any increased recovery. The same material, and the same reagent after evaporating off the water and then heating to about 60 degrees above the temperature of boiling water, gave a recovery of 99%; and in a shorter time; and with one half the original concentration and quantity of the reagent, and hence with one half the cost of chemical reagent.

In another case, with copper silicate ore running about 2% copper, and which to date is not commercially recoverable, 400 pounds of 5% sulphuric acid (that is 20 pounds of acid per ton) per ton of ore is all that is required to give a recovery so perfect that there is not a trace of copper in the tails.

In this case the heat drives off the water of crystallization and the small amount of sulphuric acid put into hot concentrated condition by the heat completely dissolves all of the copper in the ore.

In the case of carnotite ore, the valuable constituents are partially dissolved by the chemical reagent and the remaining valuable constituents are freed by the chemical reagent from the lime which acts to cement and hold them, so that they may be recovered from the slimes. This, of course, is simply another condition that is met by my process, and which aids in proper commercial recovery of values.

In other words my reagent process may not only dissolve but may also free though not dissolve materials which otherwise could not be recovered on a commercial basis.

In putting my process into actual practice the material may be handled in any of the usual ways and with any of the usual machines, devices or equipment, or may be handled in any special manner and with any special machinery or equipment that may be best suited to each case.

Also, any sequence of operations or repetitions of same may be used that best fit the case in hand. That is, crusher, classifiers, thickeners, flotation devices and processes, processes for the recovery of values from slimes, jigs, agitators, storage tanks, leaching tanks, rubbing machines which do not pulverize, precipitation methods and devices, electro-magnetic, electro-static or similar devices, all may be employed either in combination with or in addition to my process, to the one end of obtaining the best recovery at the lowest total cost.

The tails may be put through my process, and the tails from my process again put through my process, either with the use of heat above or below the boiling point of water or whatever other diluent is used. Slimes carrying values which my process has freed may be properly treated and the values recovered.

My process may be essentially continuous in combination with or without other equipment and processes, or it may be carried out upon batches or limited quantities of material in combination with or without other equipment and processes. Each case of course is to be handled to provide the best results under the existing conditions by the best complete treatment.

But, whatever other operations, methods or devices are employed in all cases, the process consists of the addition of a relatively small amount of a dilute chemical reagent, the evaporation of the desired amount of the diluent and the raising of the temperature of the material and the chemical reagent to the desired degree, washing the material to put the soluble compounds into solution and/or freed valuable material into slimes, and the recovery of the values from the solution or slimes by chemical precipitation methods or in any other proper way. Having now described my process, what I claim as new, and desire to protect by Letters Patent, is as follows:

The process of recovering metallic values from ore, which process comprises the adding of dilute sulphuric acid to the ore to be treated, which in amount is small in comparison with that of the ore, and effecting an intimate mixing of the ore and acid whereby each ore particle becomes enveloped in a film of the acid, subjecting the ore-acid mixture to heat so that the film coating of each ore particle is acid in concentrated form, the acid reacting with the metallic values of the ore particles to produce water soluble metallic compounds, said acid being applied in such a manner that there remains in the mixture at the end of the heating period all of the metallic values originally in the ore, employing water for washing out the water soluble metallic compounds from the solid residues of the ore, and ultimately recovering the metallic values from the wash water.

THEODORE EARLE.